Aug. 2, 1960
D. M. GREER
2,947,437
STORAGE TANKS FOR LIQUIDS
Original Filed April 23, 1957
2 Sheets-Sheet 1
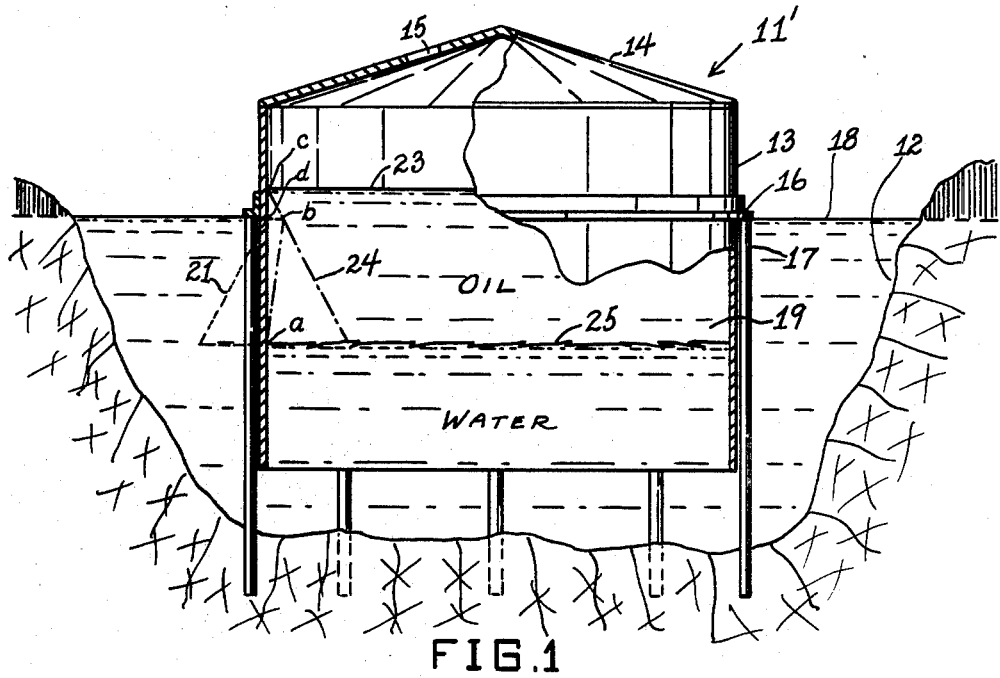
FIG.1
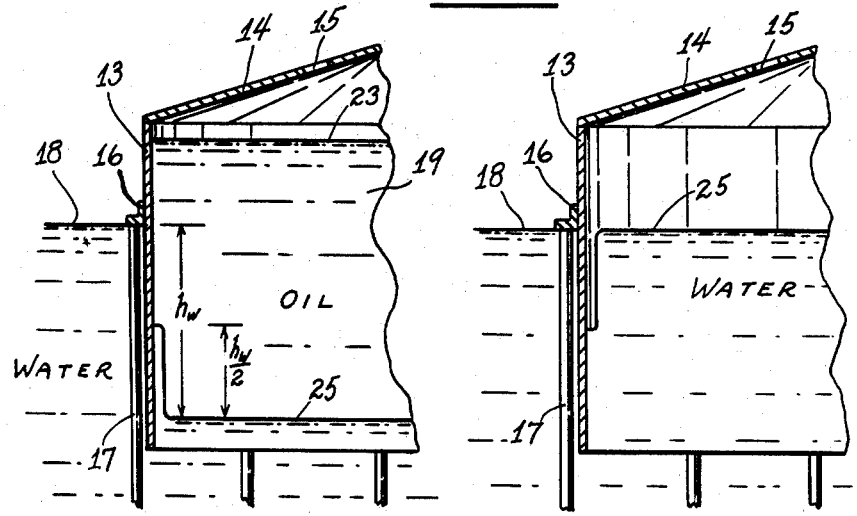
FIG.2
FIG.3
INVENTOR.
DAVID M. GREER
BY Herman L. Gordon
ATTORNEY INVENTOR.
DAVID M. GREER
BY Herman L. Gordon
ATTORNEY

United States Patent Office 2,947,437
Patented Aug. 2, 1960

2,947,437
STORAGE TANKS FOR LIQUIDS
David M. Greer, 98 Greenwood Ave., Montclair, N.J.

Original application Apr. 23, 1957, Ser. No. 654,541, now Patent No. 2,924,350, dated Feb. 9, 1960. Divided and this application Feb. 24, 1958, Ser. No. 717,257

5 Claims. (Cl. 220—13)

This is a division of application S.N. 654,541 filed April 23, 1957 and entitled "Storage Tanks for Liquids," issued as U.S. Patent No. 2,924,350.

This invention relates to storage tanks for liquids, and more particularly to tanks which are partially immersed in water or are erected on soft or marshy ground and which are employed to store liquids of different density than water, such as oil, or the like.

A main object of the invention is to provide a novel and improved method and means for storing liquids, especially liquids which are of less density than water, such as oil, or the like.

A further object of the invention is to provide an improved storage means for oil or other liquids, said means being simple in construction, being easy to erect, and requiring no expensive excavations or foundations.

A still further object of the invention is to provide an improved storage tank for oil or similar liquids, said tank being arranged so that it may be set up on soft or marshy ground, requiring minimum expense for excavation, and allowing the use of inexpensive materials.

A still further object of the invention is to provide an improved storage tank for oil or similar liquid, said tank being partly submerged in water and utilizing the hydrostatic pressure of the water to balance a large portion of the hydrostatic pressure of the contents of the tank, whereby the stresses in the walls of the tank are greatly reduced, and whereby said walls may be made of relatively light and inexpensive materials.

A still further object of the invention is to provide improved liquid storage tanks which may be located on relatively cheap land, which are protected against fire hazards, and which may therefore be placed relatively close together.

A still further object of the invention is to provide an improved liquid storage tank which is sturdy in construction, which may be built of cheap material, and which may be located on soft or marshy ground, or may be located in shallow water, without requiring the use of expensive foundations or of an excessively large number of piles or other supports.

Further objects and advantages of the invention will become apparent from the following description and claims, and from the accompanying drawings, wherein:

Figure 1 is an elevational view, partly in vertical cross-section, taken through a liquid storage tank according to the present invention, shown installed in a shallow excavation in marshy ground.

Figure 2 is a fragmentary vertical cross-sectional view of the storage tank of Figure 1, shown with the tank filled substantially to its maximum capacity.

Figure 3 is a fragmentary vertical cross-sectional view of the storage tank of Figure 1 but showing the tank with the storage space thereof substantially empty.

Figure 4:
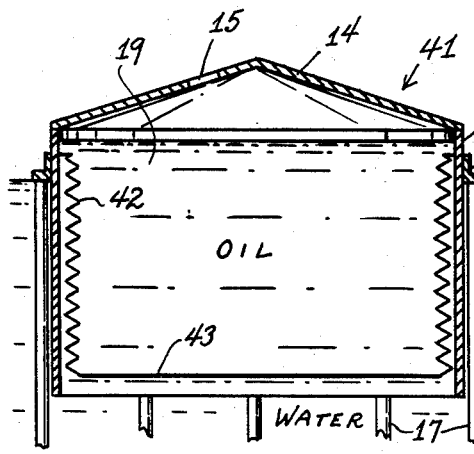
Figure 4 is a vertical cross-sectional view taken through a further form of liquid storage tank according to this invention, shown filled substantially to maximum capacity.

Referring to the drawings, and more particularly to Figures 1, 2 and 3, 11' generally designates an oil storage tank according to the present invention, shown positioned in a shallow excavation 12 in soft or marshy ground. The tank 11' comprises a generally cylindrical vertical shell 13 of relatively thin material, such as sheet metal, sheet plastic, a combination of wire mesh (or perforated metal) and sheet plastic, or the like, provided with an apertured conical roof 14, the aperture thereof being shown at 15 and providing access to the contents of the tank.

Designated at 16 is a flanged supporting ring which is secured to the exterior of the shell 13 at the intermediate portion thereof and which rests on vertical piles 17 spaced around the shell and embedded in the soft ground at the bottom of the excavation 12.

As shown, the piles are of sufficient height to support the ring 16 substantially at the water level plane, shown at 18, and the ring is secured to the shell 13 substantially at a location thereon such that the height of the portion of the tank above outside water level is to the total height of the tank approximately as the difference between the densities of water and the liquid to be stored, for example, a quantity of oil 19, is to the density of water.

A safety margin may be provided by locating ring 16 slightly higher on shell 13 than would be determined by the above ratio.

The dotted right triangle 21 in Figure 1 graphically shows the variation of hydrostatic pressure on the outside of shell 13 with depth, produced by the outside water. As is pointed out in the above-mentioned application, Serial No. 654,541, since the density of water is considerably more than that of oil, the water enters the open bottom of shell 13 and can support the lighter oil at a horizontal interface, where the hydrostatic pressures of the water and oil are balanced. The level of the top surface of the oil, shown at 23, is thus elevated above the outside water level 18, and the variation of hydrostatic pressure on the inside of the shell 13 is graphically illustrated by the dotted right triangle 24. The variation of unbalanced pressure on the shell is graphically shown in Figure 1 by the small inner triangle formed by connecting the points $a$, $b$ and $c$.

It can be shown, as is done in application S.N. 654,541, that the maximum hydrostatic pressure on the tank wall is limited to the product of the hydrostatic pressure at the interface between the oil and water and the difference in density between the stored liquid and water divided by the density of water. Thus, $$p_m = p_0 \left[ \frac{D_w - D_o}{D_w} \right]$$

where $p_m$ = maximum hydrostatic pressure on the tank wall,
$D_w$ = density of water,
$D_o$ = density of the oil,
$p_o$ = hydrostatic pressure at the interface.

It will be further seen that the maximum hydrostatic pressure on the shell occurs at the line $db$, and that this maximum pressure is relatively small as compared with the balanced pressure values at the point $a$. In other words, by submerging the shell in the manner illustrated, the effective maximum hydrostatic pressure on the shell is reduced by a coefficient determined by the difference in densities of the oil and water divided by the density of water.

In view of this, the shell can be constructed of relatively thin, inexpensive material, since it is never required to resist any substantial amount of hydrostatic pressure.

The ring 16 serves as a reinforcement at the area of maximum hydrostatic pressure on the tank, further reducing the maximum load on the tank wall.

Since the oil is supported by the outside water at the interface between the oil and water, the piles 17 are required only to support the unbalanced weight of the tank, namely, the difference between the weight of the tank (including roof 14 and ring 16) and the bouyant force acting on the submerged portion of shell 13. Therefore, relatively few piles are required, and the piles need not be driven to a great depth.

In the form of the invention illustrated in Figures 1, 2 and 3 a flexible bag or diaphragm 25 of water-tight, impermeable material is sealingly secured to the inside wall surface of shell 13 at a level substantially halfway between the outside water level 18 and the bottom of the tank. The flexible bag or diaphragm 25 may be of any suitable flexible, readily foldable sheet material, such as thin polyethylene, or the like, so that it may readily fold or crumple as the quantity of oil 19 changes and as the unbalanced hydrostatic pressure in the upper portion of the tank similarly changes. The bag or diaphragm 25 will assume a substantially horizontal folded or crumpled position, as in Figure 1, when the oil level 23 is such that the hydrostatic pressure acting on its bottom surface is sufficient to substantially balance the weight of the oil 19 therein. Thus, by employing the bag or diaphragm 25, positive separation of the oil and water is obtained, and the hydrostatic pressure of the outside water may still be utilized to greatly reduce the loading on the wall of shell 13.

When the tank is substantially full, as shown in Figure 2, the bag or diaphragm 25 will assume a depending distended configuration. The bag is preferably of a depth approximately equal to one half of the height $h_w$ of the outside water level from its bottom wall when thus distended, and preferably is sealingly secured to the inside surface of the shell 13 at a level midway between said outside water level and said bottom wall, as shown in Figure 2.

Thus, when the tank is empty, the bag or diaphragm 25 will be distended upwardly, as shown in Figure 3, and the inside water level will be substantially the same as the outside water level.

The bag 25 is substantially cylindrical in shape when distended, in which position the bottom wall thereof will be flat and horizontal. The outside diameter of the distended bag is slightly less than the inside diameter of the vertical shell member 13.

Figure 5:
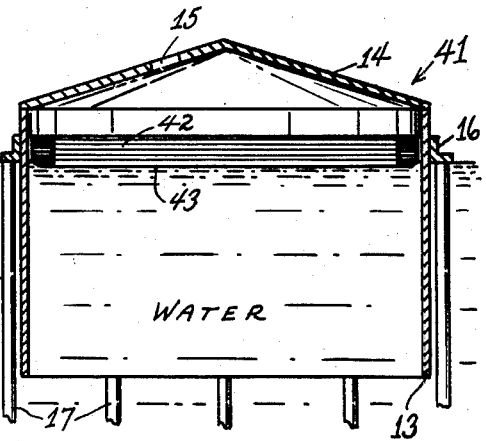
Figure 5 is a vertical cross-sectional view of the tank of Figure 4 with the storage space thereof substantially empty.

Referring now to the form of the invention shown in Figures 4 and 5, 41 generally designates a tank adapted to be used substantially in the same manner as the tank previously described. Tank 41 comprises an outer substantially rigid shell 13 provided with an apertured roof 14. Secured inside the shell 13 is a vertically flexible bag or diaphragm 42 generally of bellows form so that it can be extended or contracted vertically to change its volume. The bellows member 42 has a flat, substantially rigid bottom wall 43 against which the major portions of the opposing hydrostatic forces of the liquid contents of the tank, for example, a quantity of oil 19, and the outside water act, whereby the bellows member is distended downwardly in the manner shown in Figure 4 when a substantial amount of liquid 19 is in the tank. The top rim of the bellows member 42 is secured to the inside surface of shell 14 at a level sufficiently above the outside water level so that the bellows member will be able to be substantially completely collapsed when the tank is empty and so that under these conditions, the inside water level and the bottom wall 43 will be substantially the same as level as the outside water level, as is shown in Figure 5.

While Figures 4 and 5 show a tank provided with a support ring 16, this structure can also be employed in a tank provided with floats or a float ring for supporting same in the water.

The bellows member 42 may be formed of any suitable material, for example, polyethylene plastic, or the like, having the required amount of flexibility and toughness to withstand repeated vertical extension and contraction as the amount of liquid 19 in the tank changes.

Figure 6:
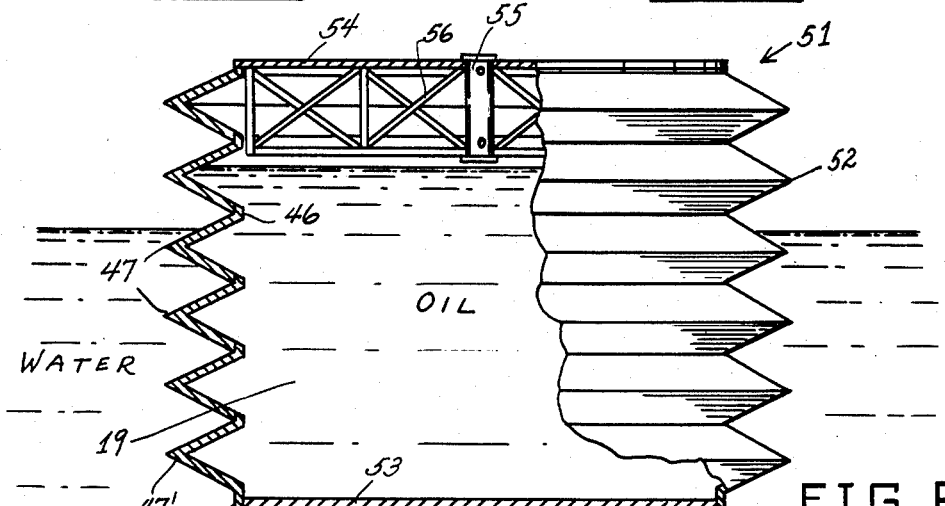
Figure 6 is an elevational view, partly in vertical cross-section, of a further form of liquid storage tank according to this invention.
Figure 7:
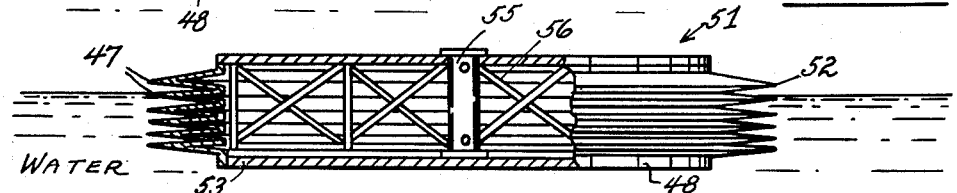
Figure 7 is a view similar to Figure 6, showing the tank of Figure 6 in a substantially empty condition.

In the form of the invention shown in Figures 6 and 7, the tank is designated generally at 51 and comprises a flexible bellows member 52 having a rigid bottom wall 53 and a rigid top wall 54 provided with a central rigid vertical conduit 55 which is of substantial height and extends downwardly a substantial distance into the tank, providing access to the liquid contents 19 thereof. The top portion of the bellows member 52 is stiffened around the conduit 55 and beneath the top wall 54 by a suitable truss framework 56. Thus, an air space is defined in the upper portion of the tank which is of sufficient volume to float the tank when empty, as shown in Figure 7.

The bellows member 52 is sufficiently flexible vertically to distend from the substantially empty condition thereof, shown in Figure 7, to the expanded condition thereof, shown in Figure 6, wherein the tank is substantially full.

The bellows member 52 may be fabricated in any suitable manner from material of requisite flexibility and toughness. Thus, the bellows member may comprise a series of joined flexible annular ring elements 47 which are generally V-shaped in transverse cross-section, each ring element having a top flange 46 to which the bottom edge of the upwardly adjacent ring element is secured. The top wall 54 is secured to the top flange 46 of the uppermost ring element. The lowermost ring element, shown at 47', has a depending annular flange 48 in which the bottom wall 53 is secured.

The ring elements 47 may be formed from generally V-shaped strips of flexible material, such as plastic material, light gauge metal, or the like, which may be manufactured by extrusion, rolling, or any other well-known process. The strips may be prepared in the form of a continuous length wound on a reel, or in the form of suitable lengths fastened in bundles, so that the tank may be fabricated in the field by first forming the annular rings from the strips and then joining the rings to produce the bellows structure.

Any of the tanks above described, having bottom walls for positive separation of the stored liquid from the outside water, can be used to store liquids which are miscible with water, lighter than water, heavier than water, or which are immiscible with water.

While certain specific embodiments of liquid storage tanks have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A storage tank comprising a relatively thin vertical shell member open at its bottom end and immersed in a body of water so that water is free to enter the bottom portion of said shell member and can exert upward force therein, a quantity of liquid of lesser density than water contained in said shell member and supported by the water in the bottom portion thereof so that the level of the top surface of said liquid is substantially higher than the level of the outside water, whereby the liquid exerts a maximum outward bursting force on the shell member at the level of the outside water, an annular continuous reinforcing band secured externally to said shell member at the level of the outside water and opposing said outward bursting force on the shell member, a plurality of vertical piles supportingly engaging beneath said band to support said shell member at a substantially constant depth of immersion, and an impervious flexible member substantially in the form of a cylinder with a closed flat bottom, said cylinder having an outside diameter slightly less than the inside diameter of the vertical shell member, the upper rim of said cylinder being impermeably attached to the inside surface of the shell member at a level located substantially midway between said reinforcing band and the flat bottom when the flexible member is in a completely downwardly distended condition, said flexible member being sufficiently thin so that by flexing, folding and crumpling it can dispose itself to constitute an approximately flat and level surface separating said liquid from the water in the bottom portion of the shell member, said shell member extending downwardly a sufficient distance to completely surround said flexible member in said completely downwardly distended condition.

2. The structure of claim 1, and wherein said band is provided with an outwardly extending flange and said vertical piles supportingly engage beneath said flange to support said shell member at said substantially constant depth of immersion.

3. The structure of claim 1, and wherein said shell member is provided with an apertured roof.

4. The structure of claim 1, and wherein said impervious flexible member comprises thin polyethylene sheet material.

5. The structure of claim 1, and wherein said shell member comprises an inner thin sleeve and an outer reinforcing sleeve of foraminous sheet material.

References Cited in the file of this patent

UNITED STATES PATENTS

| | | |
|---|---|---|
| 1,460,999 | Cooper | July 23, 1923 |
| 2,432,025 | Lorenz | Dec. 2, 1947 |
| 2,578,090 | Plummer | Dec. 11, 1951 |
| 2,647,657 | Krupp | Aug. 4, 1953 |
| 2,798,633 | Cornell et al. | July 9, 1957 |

FOREIGN PATENTS

| | | |
|---|---|---|
| 14,531 | Norway | Oct. 31, 1904 |
| 317,405 | Great Britain | June 19, 1930 |
| 860,130 | France | Sept. 24, 1940 |